United States Patent [19]

Wuest et al.

[11] Patent Number: 4,968,789
[45] Date of Patent: Nov. 6, 1990

[54] PROCESS AND MEANS FOR THE PURIFICATION OF CELLULOSE ETHERS

[75] Inventors: Willi Wuest, Ratingen-Hoesel; Wilfried Raehse, Duesseldorf; Guenther Just, Hilden; Dieter Kuehling, Monheim; Siegfried Emde, Duesseldorf; Erhard Kuehn, Willich, all of Fed. Rep. of Germany

[73] Assignee: Henkel Corporation, Ambler, Pa.

[21] Appl. No.: 238,664

[22] Filed: Aug. 31, 1988

[30] Foreign Application Priority Data

Sep. 2, 1987 [DE] Fed. Rep. of Germany ....... 3729240

[51] Int. Cl.$^5$ ...................... C08B 37/00; B01D 35/22; B01D 33/00
[52] U.S. Cl. ..................................... 536/56; 210/348; 210/367; 210/374
[58] Field of Search ........................... 536/56, 58, 128; 210/348, 360.2, 367, 374, 380.1

[56] References Cited

U.S. PATENT DOCUMENTS

| | | | |
|---|---|---|---|
| 3,900,313 | 8/1975 | Martin | 423/344 |
| 4,398,024 | 8/1983 | Bernert et al. | 536/85 |
| 4,447,406 | 5/1984 | Mein | 423/198 |

*Primary Examiner*—John Kight
*Assistant Examiner*—Carlos Azpuru
*Attorney, Agent, or Firm*—Wayne C. Jaeschke; James K. Luchs

[57] ABSTRACT

Process and means for purifying cellulose ethers without flocculation points or with relatively high flocculation points (up to 95° C.) and thermoplastic, i.e. highly propoxylated, products made from cellulose in any form, the crude product is first suspended and the suspension liquid subsequently separated in a reverse filter centrifuge a single-stage or multistage wash can be carried out. The filter cake is discharged by reversal of the filter cloth of the centrifuge.

4 Claims, 2 Drawing Sheets

PROCESS AND MEANS FOR THE PURIFICATION OF CELLULOSE ETHERS

BACKGROUND OF THE INVENTION

1. Field of the Invention:

This invention relates to a process and means for the purification of cellulose ethers and derivatives thereof.

2. Statement of Related Art:

Cellulose ethers are industrially produced by the reaction of cellulose in the form of powder, short-staple fibers or chips or sheets with one or more etherifying agents in the presence of sodium hydroxide. Monochloroacetic acid or rather the sodium salt of monochloroacetic acid, methyl chloride, ethylene oxide and/or propylene oxide are often used as the etherifying agents. Depending on the etherification process and the degrees of substitution, the products obtained either have no flocculation point (for example carboxymethyl, hydroxyethyl celluloses) in the usual measuring range from 20° to 100° C. and even higher or become insoluble in the event of an increase in temperature and flocculate (methyl, hydroxypropyl celluloses).

Cellulose ethers with no flocculation points are freed from the usual secondary products, such as sodium chloride glycols, polyglycols, glycolates, by washing with alcohol/water mixtures.

Cellulose ethers having low flocculation points may be freed very easily from the secondary products (sodium chloride, methanol, glycols) by washing with hot water and may be washed free from salts.

The working up of derivatives having flocculation points above 80° to 85° C. presents difficulties. Since there is no single temperature at which all the macromolecules of a solution become insoluble at the same time, it would be better to speak in terms of a flocculation range which is characterized by indication of the flocculation point.

For products such as these, washing with hot water is no longer possible without significant losses of product and clogging of the apparatus used for working up.

The purification of cellulose ethers having relatively high flocculation points and those showing thermoplastic properties presents considerable difficulties because the conventional centrifuges which, basically, would be suitable for the separation and purification of such substances do not permit shear-free discharge of the product, residual layers remaining in the centrifuges generally cannot be avoided without special purification processes and considerable losses of product have to be accepted during centrifuging on account of the relatively coarse sieves used.

The object of the present invention is to provide a purification process for cellulose ethers which may be universally applied to all cellulose ethers. Another object of the invention is a process for, purifying cellulose ether derivatives having high flocculation points in the range from 80° to about 95° C. and higher, and to thermoplastic, more especially propoxylated, products. It is a further object of the invention to provide a process for with minimal product losses which provides shear-free product discharge with no residual layers.

BRIEF DESCRIPTION OF THE INVENTION

Other than in the operating examples, or where otherwise indicated, all numbers expressing quantities of ingredients or reaction conditions used herein are to be understood as modified in all instances by the term "about".

For the process of the invention, the objects are achieved by separating the suspension liquid and washing the cellulose ethers and their derivatives in a reverse filter centrifugation zone. The process of this invention is workable irrespective of the type and form of cellulose used which is present, for example, in powder form, fibrous form, chip form or as a roughly torn sheet. The process of the invention comprises separating the cellulose ethers from a liquid suspension by passing the liquid through the filter medium of a reverse filter centrifuge; washing the cellulose ethers; and reversing the filter medium to discharge the cellulose ethers. Novel means will become apparent from the following description.

DETAILED DESCRIPTION OF THE INVENTION

Where a reverse filter centrifuge is used, the material of the particular cellulose ether is not subjected to shearing stress during product discharge. Accordingly, even highly propoxylated thermoplastic products can be purified. Such highly propoxylated materials and their preparation are well known to those skilled in the art and require no further description herein. Since the filter cloth of a reverse filter centrifuge is spun clean during the reversal phase, no residual layers remain in the machine on completion of the particular working cycle, nor are any deposits left on or in the filter cloth.

Since a reverse filter centrifuge works on the principle of filter-medium filtration, product losses (including hemicellulose) are minimal providing the filter cloth is suitably selected. This choice of the filter cloth, in combination with the fact that it is spun clean after reversal, unexpectedly affords the further advantage that the product does not adhere to, nor is pressed into, the filter cloth. There was even less reason to expect this important effect to occur insofar as the filter cloth of a reverse filter centrifuge would normally be expected to clog up in a short time on account of the absence of any backwashing facility.

According to another aspect of the invention, cellulose ethers having a flocculation point below about 95° C. are washed with boiling water, i.e. with water at a temperature of 100° C., in the reverse filter centrifuge. By contrast, cellulose ethers having a flocculation point of more than about 95° C. are washed with a water/alcohol mixture, more especially at around 15° to 60° C., in the reverse filter centrifuge to be used in accordance with the invention. In addition, the products can be crosslinked on the centrifuge and after crosslinking, all products are intended to be washed with water at a temperature of 15° to 40° C. in the reverse filter centrifuge.

According to another aspect of the invention, the filter cake separated from the reverse filter centrifuge is treated with steam inside the centrifuge before the final spin drying phase.

In another embodiment of the invention, a reverse filter centrifuge designed to be charged internally with steam is preferably used for this purpose.

Finally, in another embodiment of the invention, a reverse filter centrifuge is used in which the inlet pipe and the radial plate are sealed off from one another in a steam-tight manner where they contact one another.

Treating the filter cake with steam is particularly useful for establishing a low residual moisture content in the filter cake and also for contributing faster centrifugation.

By virtue of the fact that the interior of the centrifuge is sealed off in steam-tight manner the steam is only able to flow outwards through the filter cake.

One embodiment of an apparatus for carrying out the process according to the invention is described by way of example with reference to the accompanying diagrammatic drawings wherein.

Figure 1:
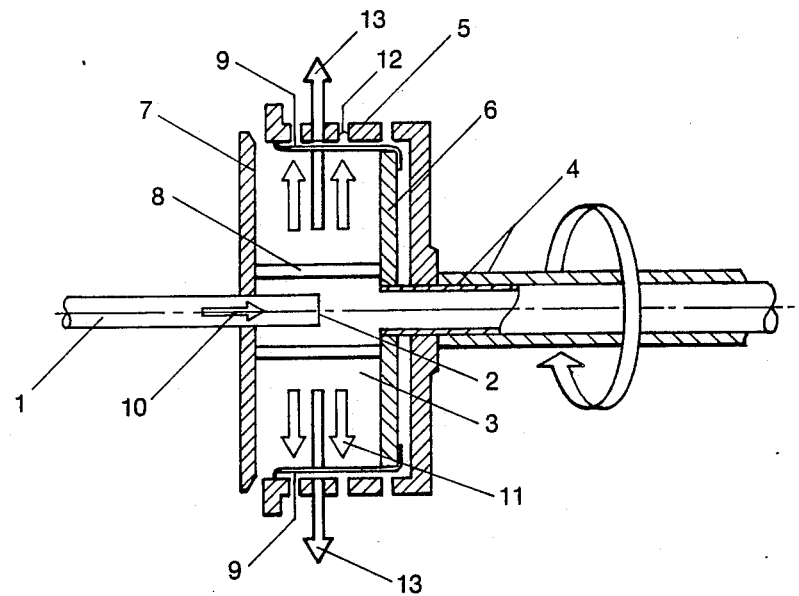
FIG. 1 is a section through a reverse filter centrifuge in the working position.

The reverse filter centrifuge shown in FIG. 1 comprises a fixed inlet pipe 1 for suspensions and washing liquids and, optionally, steam with an outlet 2 to the interior 3 of the centrifuge. A drive shaft 4 consisting of an inner shaft and an outer shaft is provided coaxially of the inlet pipe 1. A split screen cage 5 is fixedly connected to the outer shaft of the drive shaft 4 and a radial plate 6 is fixedly connected to the inner shaft of the drive shaft 4. In addition, a radial plate 7 is connected to the drive shaft 4 by webs 8 connecting the plates 6 and 7 while a filter cloth 9 is connected to the drive shaft 4 through the radial plate 6 and the split screen cage 5. In the embodiment illustrated, the inner and outer shaft of the drive shaft 4 rotate at the same speed. The inner shaft is hydraulically extendable. In the working position shown in FIG. 1, the outlet 2 communicates with the interior 3 of the centrifuge through the gaps in the webs 8.

Figure 2:
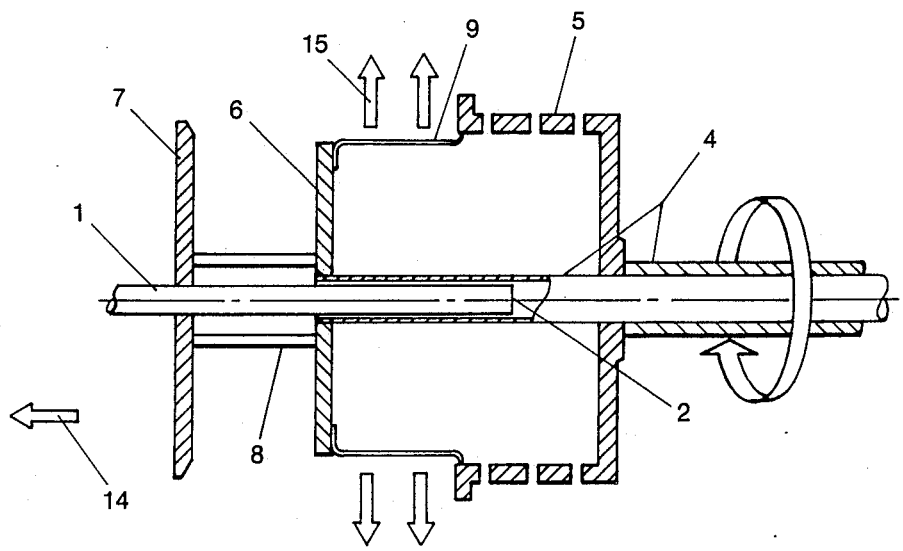
FIG. 2 is a section through a reverse filter centrifuge after the reversal phase.

In the reversal phase shown in FIG. 2, the two radial plates 6 and 7 are extended axially from the position within the split screen cage 5 so that the interior of the centrifuge as shown in FIG. 1 is no longer defined. The outlet 2 of the inlet pipe 1 is in any case situated within a closed part of the drive shaft 4 bearing the radial plates 6 and 7.

In the working position shown in FIG. 1, a suspension is first introduced through the inlet pipe into the centrifuge interior 3 in the arrowed direction 10. In the interior 3 of the centrifuge, the suspension is forced in the arrowed direction 11 against the inner surface of the filter cloth 9 stretched over the periphery of the centrifuge interior 3. The liquid present in the suspension is able to escape in the arrowed direction 13 through the filter cloth 9 and holes or slots 12 provided in the split screen cage 5. After the first spin drying step carried out in this way, the solid collecting in the form of a filter cake on the peripheral surface of the centrifuge interior 3, i.e. on the filter cloth 9, may be washed one or more times with the particular cleaning medium envisaged, for example water, and then spun dry and treated with steam. The cleaning medium and the steam are delivered to the interior of the centrifuge through the inlet pipe 1. After adequate cleaning of the solid to be treated in accordance with the invention, the rotating part of the centrifuge, which consists of the plates 6 and 7 and the webs 8 and which is fixedly connected to the drive shaft 4, is extended in the arrowed direction 14 from the position radially within the split screen cage 5 acting as a support for the filter cloth 9 in such a way that the filter cloth 9 is stretched substantially cylindrically between the split screen cage 5 and the periphery of the radial plate 6. Under the effect of this reversal phase which takes place at reduced rotational speed, the cleaned and spun product passes onto the peripheral surface of a rotor and is centrifuged off in the arrowed direction 15.

To be able to charge the interior 3 of the centrifuge with steam, the inlet pipe is sealed off where it passes through the radial plate 7.

The process according to the invention for the purification of cellulose ethers is described in more detail in the following example:

After reaction and removal of excess methyl chloride, a methyl hydroxyethyl cellulose (MHEC) produced from ground chemical woodpulp ($\alpha$-cellulose content approx. 93%) had the following values:
 moisture: 32.7%
 sodium chloride content: 27.3%

The salt-containing product was first mixed with hot water at 95° to 100° C. and then stored in a pressurized container. A fixed-cycle reverse filter centrifuge 600 mm in diameter was pump-filled with about 90 kg suspension per cycle from this storage container. 30 kg boiling water per cycle were required for washing.

The centrifuge was fitted with a dense filter cloth consisting of multifilament polyester with a permeability to air of approximately 50/l $m^2$ sec. at 200 Pa.

The following cycle took place in the reverse filter centrifuge:
1. filling at 1000 r.p.m. in 60 sec.
2. first spin drying at 1100 r.p.m. for 30 sec.
3. addition of washing water at 1100 r.p.m. for 10 sec.
4. second spin drying at 1100 r.p.m. for 20 sec.
5. conditioning with steam at 1100 r.p.m. for 20 sec.
6. third spin drying at 1100 r.p.m. for 30 sec.
7. reduction in speed to 550 r.p.m. in 15 sec.
8. reversal and discharge of product in 10 sec.
9. acceleration to 1000 r.p.m. in 15 sec.

A residual moisture content of 55% was determined in the product discharge after steps 8 and 9. 12 kg product per cycle containing 0.7% sodium chloride were obtained after drying. The MHEC had the following product features:
Brookfield viscosity
 (20 r.p.m., 20° C., 1% solution) 4450 mPa.sec.
 Turbidity value: 5%
 Flocculation point: 88° C.
Degrees of substitution
 (a) methoxyl; 23.4%
 (b) hydroxyethyl; 8.9%

The sodium chloride content and residual moisture content can be adjusted within the wide limits through the choice of the quantity of washing water and the operating conditions for the reverse filter centrifuge.

List of reference numerals

1=inlet pipe
2=outlet
3=centrifuge compartment
4=drive shaft
5=split screen cage
6=radial plate
7=radial plate
8=webs
9=filter cloth
10=arrow
11=arrow
12=hole
13=arrow
14=arrow
15=arrow
 We claim:

1. A process for the purification of cellulose ethers substituted with at least one group selected from methyl, ethyl, carboxymethyl, hydroxyethyl and hydroxypropyl from a liquid suspension; characterized in that the process consists of the steps:
   (1) adding the liquid suspension to a reverse filter centrifuge;
   (2) separating a washed product on a filter cloth to reduce salt content below 5%; and
   (3) reversing direction of spin in order to recover the product;

Wherein steam is employed during the process to regulate temperature.

2. The process of claim 1 where the liquid suspension is stored in a pressurized container prior to step (1).

3. The process of claim 2 where the filler cloth comprises a multifilament polymer.

4. The process of claim 3 where the multifilament polyester has a permeability to air of approximately 50/1 $m^2$ sec. at 200 Pa.

* * * * *